United States Patent
Goel et al.

(10) Patent No.: US 9,179,243 B2
(45) Date of Patent: Nov. 3, 2015

(54) DEVICE COMMUNICATION SYSTEM WITH PROXIMITY SYNCHRONIZATION MECHANISM AND METHOD OF OPERATION THEREOF

(71) Applicant: Samsung Electronics Co., Ltd., Gyeonggi-Do (KR)

(72) Inventors: Mayank Goel, Seattle, WA (US); Stacie Lynn Hibino, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/099,013

(22) Filed: Dec. 6, 2013

(65) Prior Publication Data
US 2015/0163618 A1 Jun. 11, 2015

(51) Int. Cl.
*H04S 7/00* (2006.01)
*H04W 4/00* (2009.01)
*H04W 76/02* (2009.01)
*G01S 15/46* (2006.01)

(52) U.S. Cl.
CPC ............... *H04W 4/005* (2013.01); *G01S 15/46* (2013.01); *H04W 76/023* (2013.01)

(58) Field of Classification Search
CPC ..................................................... H04S 7/302
See application file for complete search history.

(56) References Cited

U.S. PATENT DOCUMENTS

| 6,542,748 B2 | 4/2003 | Hendrey et al. |
| 2005/0113107 A1 | 5/2005 | Meunier |
| 2006/0210101 A1 | 9/2006 | Ishibashi et al. |
| 2008/0085014 A1* | 4/2008 | Chen et al. ................... 381/105 |
| 2010/0329489 A1* | 12/2010 | Karaoguz ..................... 381/307 |
| 2012/0127831 A1 | 5/2012 | Gicklhorn et al. |
| 2013/0024018 A1* | 1/2013 | Chang et al. .................. 700/94 |

FOREIGN PATENT DOCUMENTS

| KR | 10-2004-0074702 A | 8/2004 |
| KR | 10-2010-0111346 A | 10/2010 |
| KR | 10-1046697 A | 7/2011 |
| KR | 10-2012-0006900 A | 1/2012 |
| KR | 10-2013-0018364 A | 2/2013 |

OTHER PUBLICATIONS

Jae-Oh Oh, Myong-Soo Lee, and SangKeun Lee, "An Acoustic-based Relative Positioning System for Multiple Mobile Devices"; IEEE /ICCIT.2009.103 pp. 1565-1570.

* cited by examiner

*Primary Examiner* — David Bilodeau
(74) *Attorney, Agent, or Firm* — IP Investment Law Group (57) ABSTRACT

A device communication system includes: a communication interface configured to receive a wireless signal strength for locating a wireless enabled device; a control interface, coupled to the communication interface, configured to measure the wireless signal strength; a user interface, coupled to the control interface, configured to receive a left acoustic signal and a right acoustic signal for determining an acoustic direction; and a control unit, coupled to the user interface, configured to form a peer-to-peer network connection based on the wireless signal strength and the acoustic direction for displaying on the wireless enabled device.

24 Claims, 5 Drawing Sheets

DEVICE COMMUNICATION SYSTEM WITH PROXIMITY SYNCHRONIZATION MECHANISM AND METHOD OF OPERATION THEREOF

TECHNICAL FIELD

An embodiment of the present invention relates generally to a device communication system, and more particularly to a system for remotely coupling device resources.

BACKGROUND

Modern consumer and industrial electronics, especially devices such as graphical display systems, televisions, projectors, cellular phones, portable digital assistants, and combination devices, are providing increasing levels of functionality to support modern life. The enhancement of the features of these electronic devices has created overlaps in function that can have convenient effects.

Intelligent television sets have become a household centerpiece. Laptop computers and smartphones, for example, can interact with the television, for displaying photographs, playing videos, by physical cabling between the intelligent television and the laptop or smartphone. In the alternative any device that can reside on a network with the intelligent television can access it through a network router. These connections are difficult for some users to comprehend.

Smartphones can take photographs and videos, but they don't make very good viewing platforms because of the size of the display. Most smartphones could e-mail the photos or videos, but that transmission can tie-up the smartphone for a long duration and in some cases system firewalls and protection software can block the delivery of such files due to the concern about computer viruses or malware. As a result most users wait until they can dock their smartphone by linking it to their home computer. As the urgency of the moment passes, many of the files generated by the smartphones do not get stored or transferred to a reasonable transport or display device.

Thus, a need still remains for a device communication system with proximity synchronization mechanism to allow access to overlapping resources of multiple devices proximate to each other. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a device communication system, including: a communication interface configured to receive a wireless signal strength for locating a wireless enabled device; a control interface, coupled to the communication interface, configured to measure the wireless signal strength; a user interface, coupled to the control interface, configured to receive a left acoustic signal and a right acoustic signal for determining an acoustic direction; and a control unit, coupled to the user interface, configured to form a peer-to-peer network connection based on the wireless signal strength and the acoustic direction for displaying on the wireless enabled device.

An embodiment of the present invention provides a method of operation of a device communication system including: contacting a server device for locating a wireless enabled device; measuring a wireless signal strength; analyzing a left acoustic signal and a right acoustic signal for determining an acoustic direction of the wireless enabled device; and forming a peer-to-peer network connection based on the wireless signal strength and the acoustic direction.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 2:
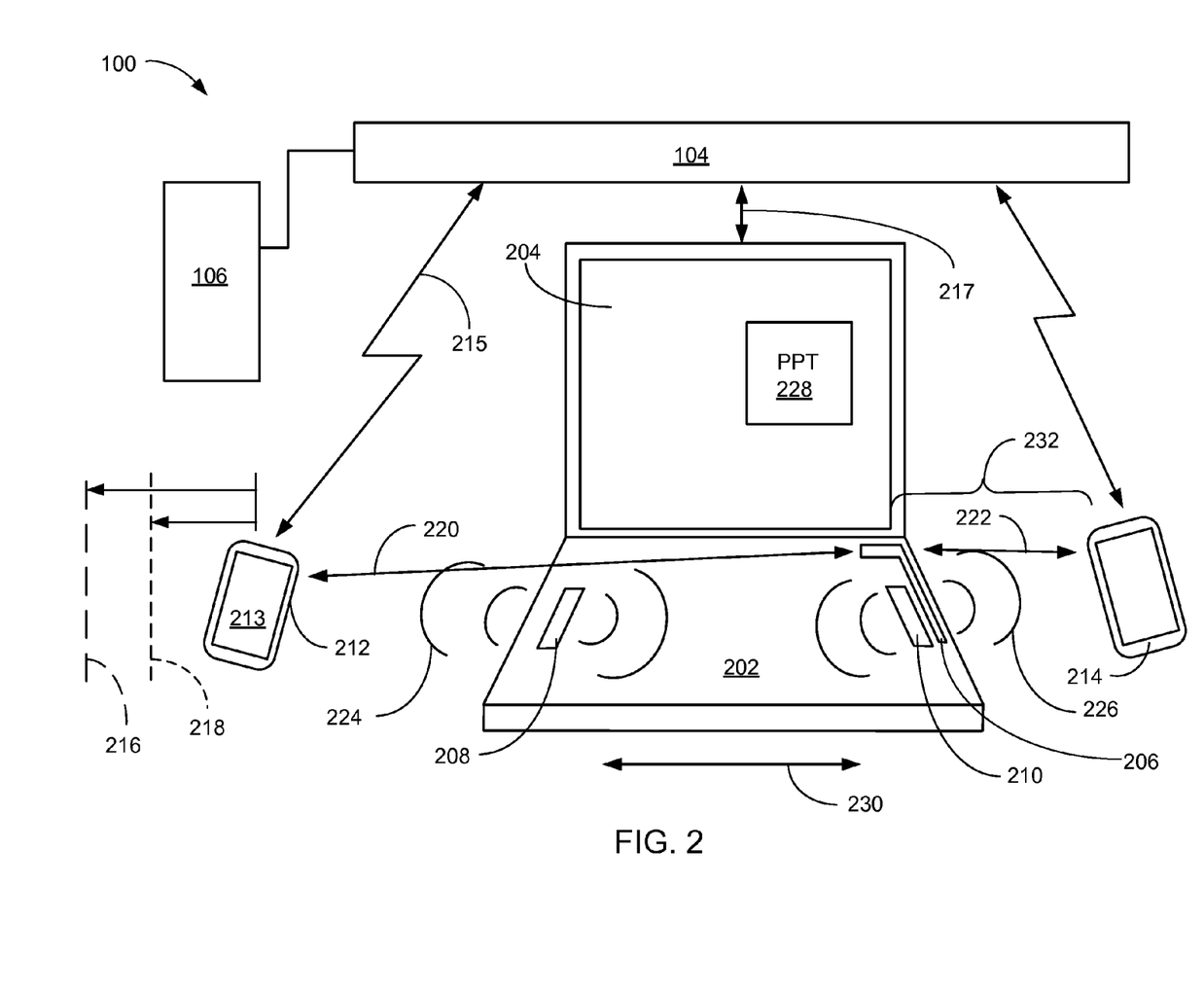
FIG. 2 is an example of the device communication system in an embodiment of the present invention.

An embodiment of the present invention provides the device communication system that can accurately determine the distance and the acoustic direction from the wireless enabled device to the first mobile device by combining the interpretation of the amplitude of the first wireless signal with the amplitude comparison of the left acoustic signal and the right acoustic signal for automatically establishing a peer-to-peer network connection through the first wireless signal. The calculation of the distance and the acoustic direction can be used to make any interaction between the wireless enabled device and the first mobile device more intuitive. For example if the first mobile device is located to the left side of the wireless enabled device, as shown in FIG. 2, a selected file can be copied from the first mobile device to the wireless enabled device by a motion, on the touch screen of the first mobile device, from a left side of the touch screen to a right side of the touch screen, toward the acoustic direction of the wireless enabled device.

An embodiment of the present invention provides the device communication system that automatically forms the peer-to-peer network connection through the first wireless signal by putting the first mobile device within the second radius from the wireless enabled device. Once the peer-to-peer network connection is formed between the first mobile device and the wireless enabled device, an application operating on the first mobile device can be configured to automatically transfer the application file from the first mobile device to the wireless enabled device for display on the display screen. In this configuration, no intervention is required to move the application file from the first mobile device to the wireless enabled device. Further if the application file is closed from the wireless enabled device, an updated copy of the application file can be transferred back to the first mobile device without intervention.

An embodiment of the present invention provides the device communication system that provides a secure access mechanism for the wireless enabled device that has electronically locked, as in sleep mode. The placing of the first mobile device within the second radius from the wireless enabled device can provide the password necessary to unlock the wireless enabled device without requiring any intervention. The peer-to-peer network connection can pass an encrypted password key from the first mobile device to the wireless enabled device in order to automatically allow the operation of the wireless enabled device to proceed.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
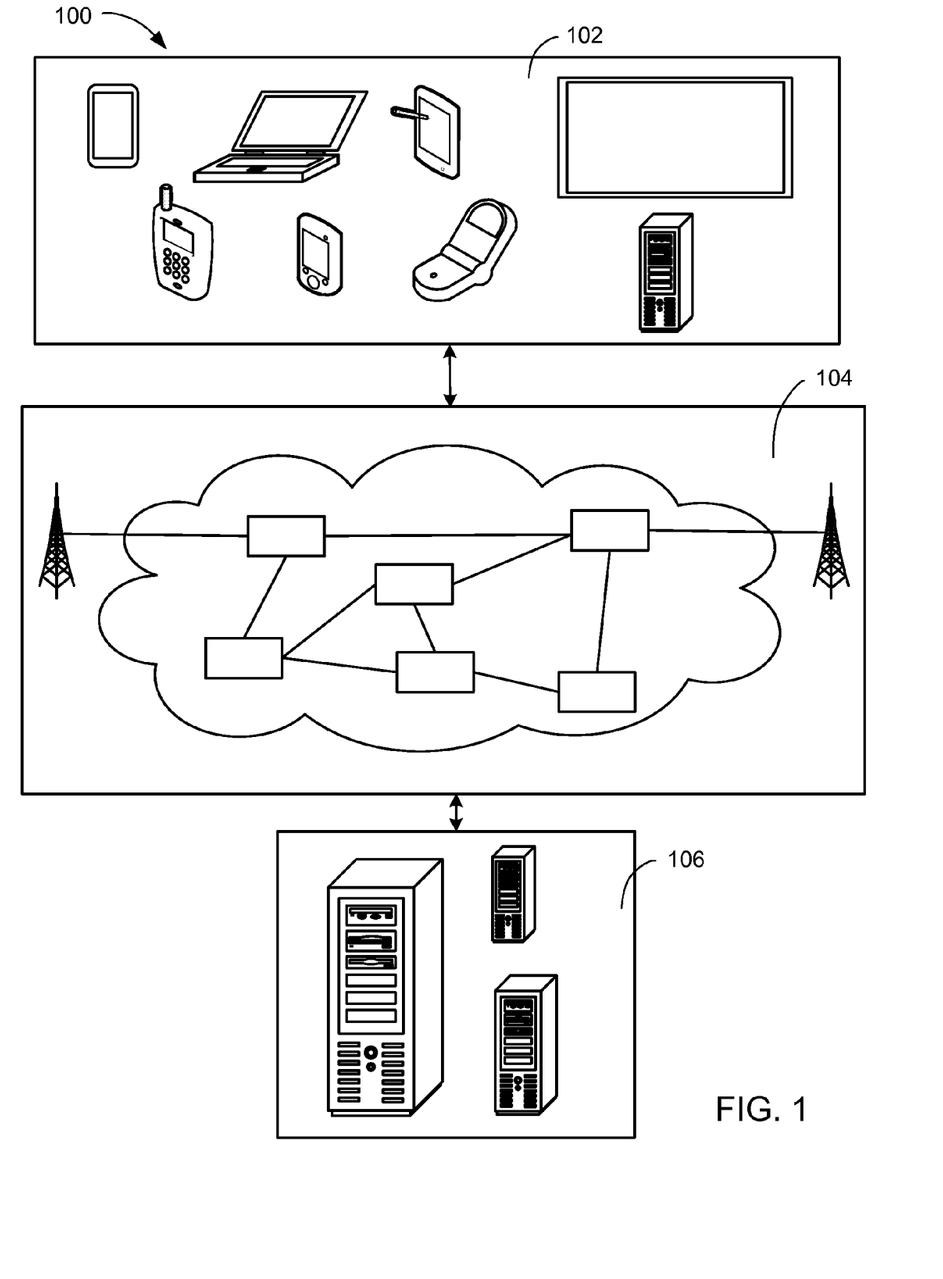
FIG. 1 is a device communication system with proximity synchronization mechanism in an embodiment of the present invention.

Referring now to FIG. 1, therein is shown a device communication system 100 with proximity synchronization mechanism in an embodiment of the present invention. The device communication system 100 includes a first device 102, such as a client, connected to a second device 106, such as a server. The first device 102 can communicate with the second device 106 through a communication path 104, such as a wireless or wired network. It is understood that several of the first device 102 can communicate with each other through a wireless networking aspect of the communication path 104.

For example, the first device 102 can be of any of a variety of devices, such as a cellular phone, personal digital assistant, a notebook computer, a tablet computer, an intelligent television, smartphone, game console, or other multi-functional communication or entertainment device. The first device 102 can couple, either directly or indirectly, to the communication path 104 to communicate with the second device 106 or can be a stand-alone device.

The second device 106 can be a server device configured as a variety of centralized or decentralized computing devices. For example, the second device 106 can be a central server, a multimedia computer, a laptop computer, a desktop computer, grid-computing resources, a virtualized computer resource, cloud computing resource, peer-to-peer distributed computing devices, or a combination thereof. In another example, the second device 106 can be a location server that monitors the location of all network capable versions of the first device 102 leveraging their geographical information derived from various state-of-the-art location services like a Global Positioning System (GPS) or Global System for Mobile communications (GSM).

The second device 106 can be centralized in a single room, distributed across different rooms, distributed across different geographical locations, or embedded within a telecommunications network. The second device 106 can couple with the communication path 104 to communicate with any number of the first device 102.

For illustrative purposes, the device communication system 100 is described with the second device 106 as a computing device, although it is understood that the second device 106 can be different types of devices. Also for illustrative purposes, the device communication system 100 is shown with the second device 106 and the first device 102 as end points of the communication path 104, although it is understood that the device communication system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include personal area network (PAN), local area network (LAN), metropolitan area network (MAN), wide area network (WAN), or a combination thereof.

Referring now to FIG. 2, therein is shown an example of the device communication system 100 in an embodiment of the present invention. The example of the device communication system 100 depicts a group of the first device 102 of FIG. 1 communicating with the second device 106 through the communication path 104. The group of the first device 102 can include a wireless enabled device 202, such as a laptop computer, tablet computer, network attached storage, or desktop computer, having a display screen 204, a wireless antenna 206, a left speaker 208, and a right speaker 210.

The first device 102 can also include a first mobile device 212 and a second mobile device 214. The first mobile device 212 can be a smartphone, cellular telephone, digital personal data appliance (PDA), or the like, can send a proximate resource request 215, such as the wireless enabled device 202. Concurrently, the second mobile device 214, such as a smartphone, cellular telephone, digital personal data appliance (PDA), or the like, can send the proximate resource request 215, such as the wireless enabled device 202.

For illustrative purposes, the first mobile device 212 and the second mobile device 214 are shown as two different devices but it is understood that the first mobile device 212 and the second mobile device 214 can both be the first device 102 as a single device but at its respective location shown in FIG. 2. Also for illustrative purposes, the first mobile device 212 and the second mobile device 214 are described as being a mobile device, although it is understood that the first mobile device 212, the second mobile device 214, or a combination can be stationary not necessarily a mobile type of device.

The proximate resource request 215 from the first mobile device 212 and the second mobile device 214 can be received by the second device 106. As part of its function the second device 106 can monitor the locations of each of the first device 102 that are network capable. The location information can be provided through GPS or GSM, within the first device 102, and provided to the second device 106.

The second device 106 can sort all available resources to identify any of the first device 102 within a first radius 216 of the first mobile device 212 and the second mobile device 214. The first radius 216, can be a large initial radius is chosen because GPS does not works reliably indoors and the granularity of GSM data is also not very high, can be 100 meters. When the second device 106 identifies each of the first device 102, that are capable of satisfying the proximity resource request 215 and are within the first radius 216, they are activated, through a wireless activation command 217 from the second device 106, as wireless access points and become the wireless enabled device 202.

The first mobile device 212 and the second mobile device 214 can detect each of the wireless enabled device 202 that is within a second radius 218, which can be less than 30 meters. The corresponding wireless signal strengths for each of the wireless enabled device 202, inside the second radius 218, can be saved on the first mobile device 212 and the second mobile device 214. The wireless signal strength of the wireless enabled device 202 does not decrease uniformly in all directions with an increase in distance. This phenomenon is very strong within a sub 3 meter range. That is to say, within the first 3 meters around the wireless enabled device 202, the signal strength decreases non-uniformly. Although most instances of the wireless enabled device 202 can have the wireless antenna 206, such as an omni-directional antenna, the accompanying electronic hardware of the wireless enabled device 202 usually means that the signal strength measured right next to the device and the strength on left and right side can be different. This depends on the placement of the wireless antenna 206 on the wireless enabled device 202.

A first wireless signal strength 220, received by the first mobile device 212, can be significantly weaker than the second wireless signal strength 222 received by the second mobile device 214 based on their individual distance from the wireless enabled device 202. The first wireless signal strength 220 can be attenuated by 10-15 dB more than the second wireless signal strength 222 due to the placement of the wireless antenna 206. The first wireless signal strength 220 and the second wireless signal strength 222 could be used to accurately calculate the distance if the acoustic direction 230 from the wireless enabled device 202 to the first mobile device 212 and the second mobile device 214 is known. The amplitude of the first wireless signal strength 220 and the second wireless signal strength 222 can decrease in amplitude proportional to the distance squared. By knowing the standard broadcast amplitude, the distance can be calculated by the first mobile device 212 and the second mobile device 214.

In order to discover the acoustic direction 230 from the wireless enabled device 202 to the first mobile device 212 and the second mobile device 214, the wireless enabled device 202 emits two human inaudible tones of different frequencies and equal amplitudes from both the left speaker 208 and the right speaker 210. By way of an example, the left speaker 208 can emit a left acoustic signal 224, such as an 18 kHz sine wave, and the right speaker 210 can concurrently emit a right acoustic signal 226, such as an 18.5 kHz sine wave. By comparing the amplitude of the left acoustic signal 224 and the right acoustic signal 226, the first mobile device 212 and the second mobile device 214 can determine the acoustic direction 230 to the wireless enabled device 202. Once the acoustic direction 230 to the wireless enabled device 202 is known, a proximity adjustment model can be selected to interpret the first wireless signal strength 220 or the second wireless signal strength 222 for determining the distance to the wireless enabled device 202.

It has been discovered that the device communication system 100 can accurately determine the distance and acoustic direction 230 from the wireless enabled device 202 to the first mobile device 212 by combining the interpretation of the amplitude of the first wireless signal strength 220 with the amplitude comparison of the left acoustic signal 224 and the right acoustic signal 226 for automatically establishing a peer-to-peer network connection 232 through the first wireless signal strength 220. The calculation of the distance and acoustic direction 230 can be used to make any interaction between the wireless enabled device 202 and the first mobile device 212 more intuitive. For example if the first mobile device 212 is located to the left side of the wireless enabled device 202, as shown in FIG. 2, a selected file can be copied from the first mobile device 212 to the wireless enabled device 202 by a motion, on a touch screen 213 of the first mobile device 212, from a left side of the touch screen 213 to a right side of the touch screen 213, toward the acoustic direction 230 of the wireless enabled device 202.

It is understood that the same type of the peer-to-peer network connection 232 can be performed on the second mobile device 214, which is located to the right side of the wireless enabled device 202 as shown in FIG. 2, a selected file can be copied from the second mobile device 214 to the wireless enabled device 202 by a motion, on the touch screen 213 of the second mobile device 214, from the right side of the touch screen 213 to the left side of the touch screen 213, toward the acoustic direction 230 of the wireless enabled device 202. It is further understood that if no file is selected, the motion on the touch screen 213 of the second mobile device 214, from the right side of the touch screen 213 to the left side of the touch screen 213, toward the acoustic direction 230 of the wireless enabled device 202 will transfer control to the wireless enabled device 202. This can be useful in order to transfer a file from the wireless enabled device 202 to the second mobile device 214 or the first mobile device 212.

By way of an example, if the wireless enabled device 202 has an application file 228, such as a Power Point™ file, displayed on the display screen 204, a motion on the touch screen 213 of the second mobile device 214, from the left side of the touch screen 213 to the right side of the touch screen 213, can transfer the application file 228 from the wireless enabled device 202 to the second mobile device 214. Prior to actually doing the transfer of the application file 228, the wireless enabled device 202 can interrogate the second mobile device 214 to determine if the appropriate application software is resident on the second mobile device 214. If the second mobile device 214 does not have the appropriate application software, the wireless enabled device 202 can offer to convert the file to a more universal format for transfer to the second mobile device 214. The conversion option can be offered on the touch screen 213 of the second mobile device 214. If the application file 228 is intended to be displayed directly from the second mobile device 214, the conversion can be accepted and a converted file can be transferred from the wireless enabled device 202 to the second mobile device 214. If however the application file 228 is to be transported by the second mobile device 214 to yet another device that does have the appropriate application software, the conversion can be declined and the application file 228 can be transferred from the wireless enabled device 202 to the second mobile device 214 in its original format.

It has been discovered that the device communication system 100 can automatically form the peer-to-peer network connection 232 by putting the first mobile device 212 within the second radius 218 from the wireless enabled device 202. Once the peer-to-peer network connection 232 is formed between the first mobile device 212 and the wireless enabled device 202, an application operating on the first mobile device 212 can be configured to automatically transfer the application file 228 from the first mobile device 212 to the wireless enabled device 202 for display on the display screen 204 as soon as the peer-to-peer network connection 232 is established. In this configuration, no intervention is required to move the application file 228 from the first mobile device 212 to the wireless enabled device 202. Further if the application file 228 is closed from the wireless enabled device 202, an updated copy of the application file 228 can be transferred back to the first mobile device 212 without intervention.

It has been discovered that the device communication system 100 can provide a secure access mechanism for the wireless enabled device 202 that has electronically locked, as in sleep mode. The placing of the first mobile device 212 within the second radius 218 from the wireless enabled device 202 can provide any password necessary to unlock the wireless enabled device 202 without requiring any intervention. The peer-to-peer network connection 232 can pass an encrypted password key from the first mobile device 212 to the wireless enabled device 202 in order to automatically allow the operation of the wireless enabled device 202 to proceed.

It is understood that the operations described between the wireless enabled device 202 and the first mobile device 212 are an example to describe the invention without limiting it. All of the operations described for the first mobile device 212 can also apply to the second mobile device 214. It is also understood that any number of the mobile device and the wireless enabled device 202 can be concurrently coupled in the peer-to-peer network connection 232.

Figure 3:
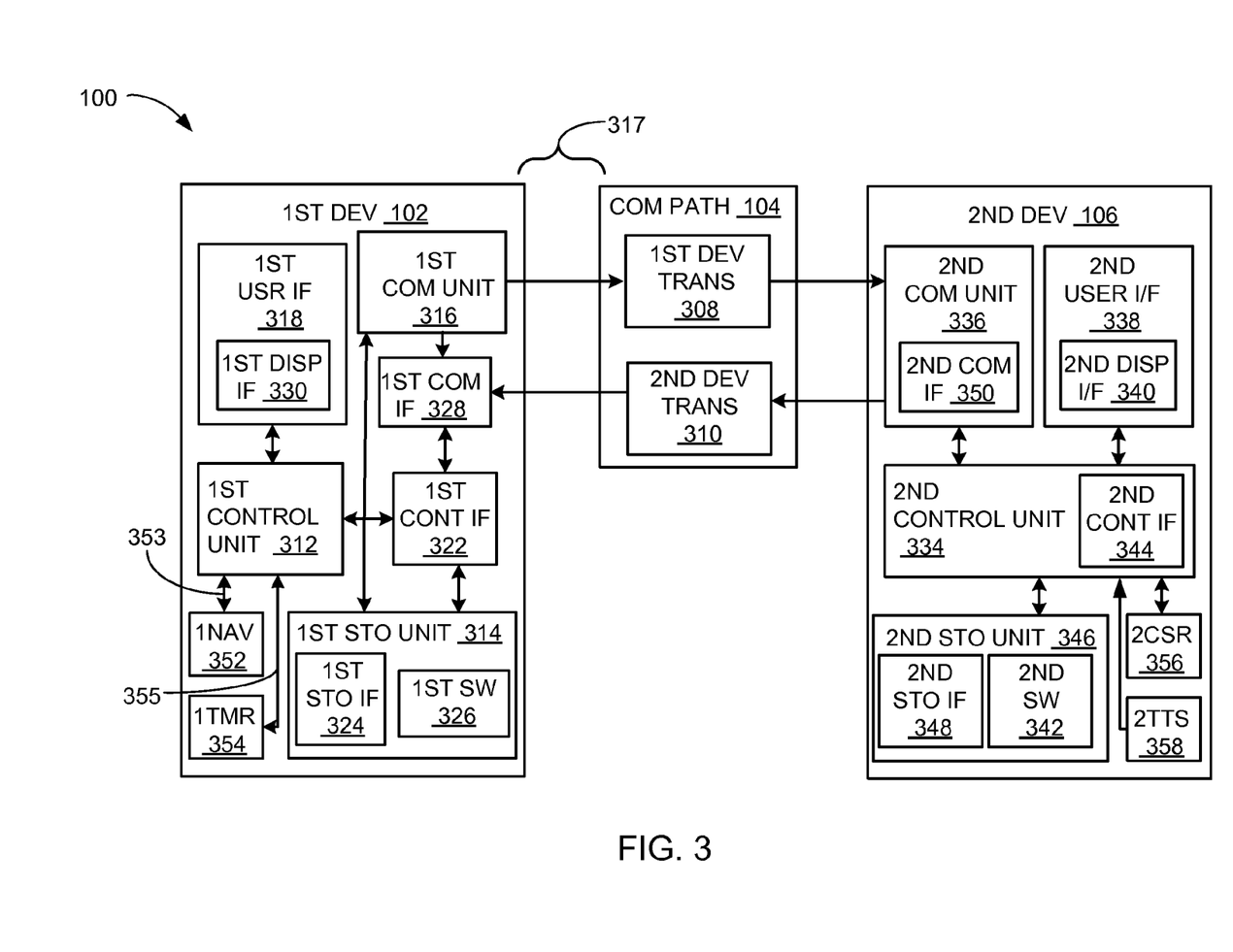
FIG. 3 is an exemplary block diagram of the device communication system.

Referring now to FIG. 3, therein is shown an exemplary block diagram of the device communication system 100. The device communication system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the device communication system 100 is shown with the first device 102 as a client device, although it is understood that the device communication system 100 can have the first device 102 as a different type of device. For example, the first device 102 can be a mobile server having a number of clients including a display interface for displaying the relevant information.

Also for illustrative purposes, the device communication system 100 is shown with the second device 106 as a server, although it is understood that the device communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can communicate through a first control interface 322. The first control unit 312 can execute a first software 326 to provide a portion of the intelligence of the device communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102. The first control interface 322 can be configured to receive a first wireless signal strength 220 of FIG. 2 through a first communication interface 328. The first control interface 322 can determine an amplitude reduction, from a standard transmission, of the first wireless signal strength 220 in order to determine the distance from the first device 102, such as the first mobile device 212 of FIG. 2, to the wireless antenna 206 of FIG. 2 of the wireless enabled device 202 of FIG. 2.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between other functional units in the first device 102. The first storage interface 324 can also be used for communication that is external to the first device 102, such as external memory, solid state disk drives, or external hard disk drives.

The first storage interface 324 can receive information from the other functional units or from external sources, or can transmit information to the other functional units or to external destinations. The external sources and the external destinations refer to sources and destinations external to the first device 102 or temporarily housed within the first device 102 and can be removed.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104 a wireless channel 317.

The first communication unit 316 can control the first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a touch screen, a video screen, a speaker, or any combination thereof.

The first control unit 312 can operate the first user interface 318 to display information generated by the device communication system 100. The first control unit 312 can also execute the first software 326 for the other functions of the device communication system 100. The first control unit 312 can further execute the first software 326 for interaction with the communication path 104 via the first communication unit 316 and the wireless channel 317.

The second device 106 can be optimized for implementing an embodiment of the present invention in a multiple device embodiment with the first device 102. The second device 106 can provide the additional or higher performance processing power compared to the first device 102. The second device 106 can converge relevant information for several of the first device 102 in order to provide groups of targeted users of the first device 102 that share common categories of the relevant information. The second device 106 can monitor the geophysical locations of several of the first device 102 in order to identify proximate resources in the range of any of the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the device communication system 100. The second software 342 can operate in conjunction with the first software 326 to execute the modules of the device communication system 100. The second control unit 334 can provide additional performance compared to the first control unit 312.

The second control unit 334 can operate the second user interface 338 to display information. The second control unit 334 can also execute the second software 342 for the other functions of the device communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314. The second storage unit 346 can also receive input from other sources for delivery to the first device 102 through the communication path 104.

For illustrative purposes, the second storage unit 346 is shown as a single element, although it is understood that the second storage unit 346 can be a distribution of storage elements. Also for illustrative purposes, the device communication system 100 is shown with the second storage unit 346 as a single hierarchy storage system, although it is understood that the device communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

A first location unit 352 can determine a device location 353 of the first device 102 by communication with a global positioning satellite. The device location 353 can be passed to the first control unit 312 for display on the first user interface 318 for presenting routing and destination information for the first device 102. The device location 353 can also be sent from the first control unit 312 through the first communication interface 316 and the first device transmission 308 for reporting the location of the first device 102 to the second device 106. The reporting of the device location 353 of the first device 102 can be used to facilitate the forming of the peer-to-peer network connection 232 of FIG. 2. The first device 102 can report the device location 353 periodically or when solicited by the second device 106 as the configuration of the device communication system 100 requires.

A first timer module 354 can be coupled to the first control unit 312. The first timer module 354 can be used to monitor durations of time between events of interest to the first control unit 312. The first timer module 354 can be scaled to measure time intervals from seconds to months and can be used in multiple processes concurrently. The first timer module 354 can measure the time or it can be used to verify an extended period of time, such as days, weeks, or months, for requesting periodic updates. The first timer module 354 can provide a time indicator 355, such as a time stamp or system clock for the first control unit 312 to associate with events of interest.

It will be understood that the modules of the first device 102 can be combined to operate as the client modules of the first device 102. For example, the client navigation module can be performed by combining the first control unit 312, the first location unit 352, the first storage unit 314, and the first user interface 318. The client entertainment module can be performed by combining the first control unit 312, the first storage unit 314, and the first user interface 318. The client safety module can be performed by combining the first control unit 312, the first communication interface 328, the first storage unit 314, and the first control interface 322, which is in control of switches and sensors throughout the first device 102.

The first communication unit 316 can couple with the communication path 104 through the wireless channel 317 to send information to the second device 106 in the first device transmission 308. The second device 106 can receive information in the second communication unit 336 from the first device transmission 308 of the communication path 104.

The second communication unit 336 can couple with the communication path 104 to send the relevant information to the first device 102 in the second device transmission 310 through the wireless channel 317. The first device 102 can receive the relevant information in the first communication unit 316 from the second device transmission 310 of the communication path 104. The device communication system 100 can be supported by the first control unit 312, the second control unit 334, dedicated hardware modules, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the device communication system 100 is described by operation of the first device 102 and the second device 106. It is understood that the first device 102 and the second device 106 can operate any of the modules and functions of the device communication system 100.

For illustrative purposes, the device communication system 100 is described by operation of the first device 102 and the second device 106. It is understood that the first device 102 and the second device 106 can operate any of the modules and functions of the device communication system 100.

Figure 4:
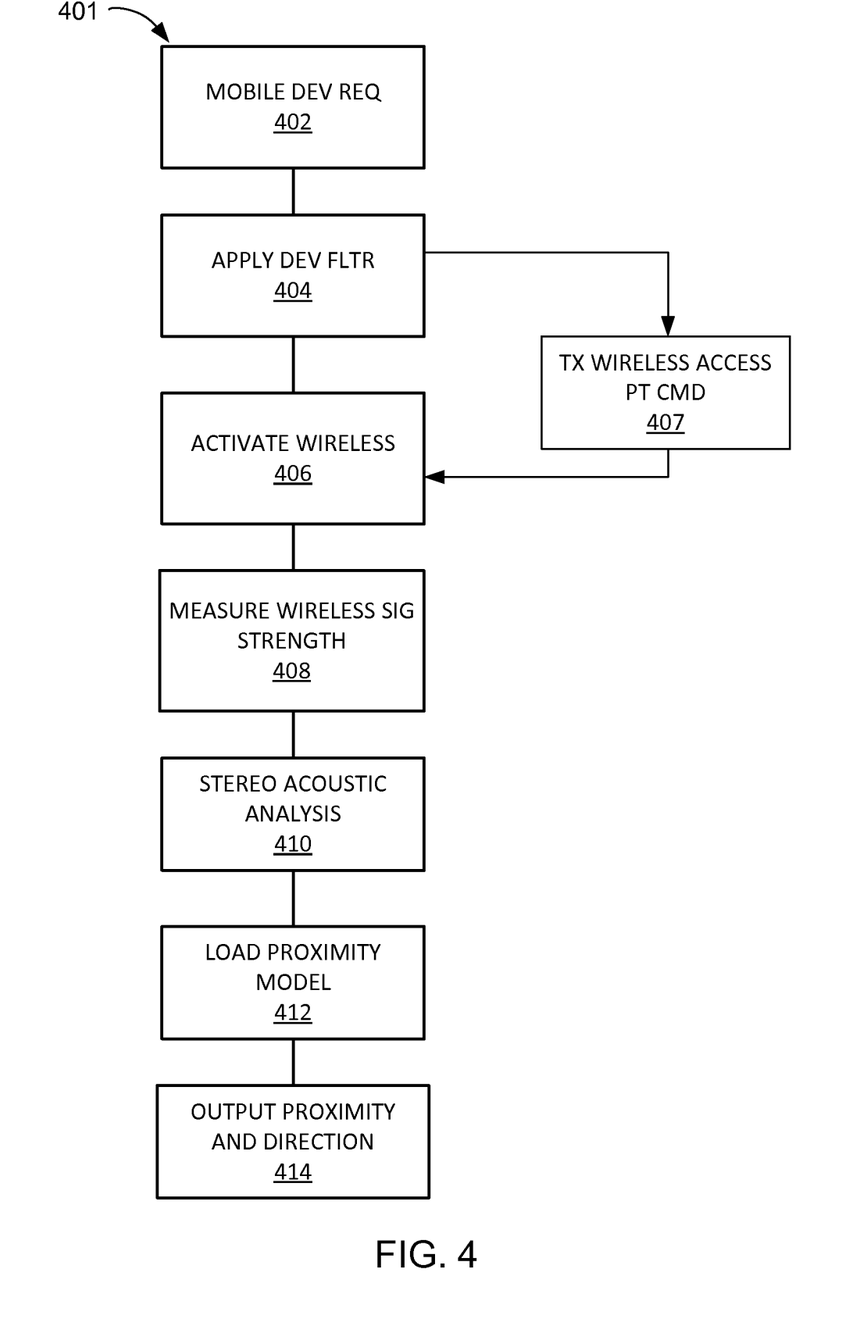
FIG. 4 is a control flow of the device communication system of FIG. 1.

Referring now to FIG. 4, therein is shown a control flow 401 of the device communication system 100 of FIG. 1. The control flow 401 of the device communication system 100 depicts the mobile device request module 402, which has the first mobile device 212 of FIG. 2 request access to overlap resources within the second radius 218 of FIG. 2 for forming the peer-to-peer network connection 232.

The flow then proceeds to an apply device filter module 404, in which each of the first device 102 of FIG. 1 within a first radius 216 of the first mobile device 212 can be identified. The flow then proceeds to an activate wireless module 406, in which each of the first device 102 within the first radius 216 is sent a wireless activation command 407, by the second device 106 of FIG. 1, and instructed to operate as a wireless access point. The first device 102 can operate as a wireless access point by transmitting the wireless signal strength 220 of FIG. 2, the left acoustic signal 224 of FIG. 2, and the right acoustic signal 226 of FIG. 2. When the first device 102 operates as the wireless access point, it becomes a wireless enabled device 202 of FIG. 2.

The flow then proceeds to a measure signal strength module 408. The measure signal strength module 408 provides the maximum value of the wireless signal strength 220 measured at the first mobile device 212 for identifying the proximate wireless enabled device 202.

The flow then proceeds to a stereo acoustic analysis module 410, which provides two human inaudible tones of different frequencies and equal amplitudes from both the left speaker 208 of FIG. 2 and the right speaker 210 of FIG. 2. By way of an example, the left speaker 208 can emit the left acoustic signal 224, such as an 18 kHz sine wave, and the right speaker 210 can concurrently emit the right acoustic signal 226, such as an 18.5 kHz sine wave. By comparing the amplitude of the left acoustic signal 224 and the right acoustic signal 226, the first mobile device 212 can determine the acoustic direction 230 to the wireless enabled device 202.

The flow then proceeds to a load proximity model module 412, in which the acoustic direction 230 from the first mobile device 212 to the wireless enabled device 202 can be used to select the appropriate adjustment model for the wireless signal strength measured at the first mobile device 212. The correction to the amplitude of the wireless signal strength measured at the first mobile device 212 can provide an accurate measure of the proximate distance between the first mobile device 212 and the wireless enabled device 202.

The flow then proceeds to an output proximity and direction module 414, in which the first mobile device 212 can utilize the distance calculated from the first wireless signal strength 220 and the acoustic direction 230 to the wireless enabled device 202 for forming a peer-to-peer network connection 232.

It has been discovered that the device communication system 100 can automatically form the peer-to-peer network connection 232 by putting the first mobile device 212 within the second radius 218 from the wireless enabled device 202. Once the peer-to-peer network connection 232 is formed between the first mobile device 212 and the wireless enabled device 202, an application operating on the first mobile device 212 can be configured to automatically transfer the application file 228 from the first mobile device 212 to the wireless enabled device 202 for display on the display screen 204. In this configuration, no intervention is required to move the application file 228 from the first mobile device 212 to the wireless enabled device 202. Further if the application file 228 is closed from the wireless enabled device 202, an updated copy of the application file 228 can be transferred back to the first mobile device 212 without intervention.

It is understood that once the peer-to-peer network connection 232 is formed, transfers of the application file 228 between the first mobile device 212 and the wireless enabled device 202 can be performed in either direction. That is to say, the first mobile device 212 can also retrieve the application file 228 from the wireless enabled device 202. The direction of transfer can be controlled by the first mobile device 212. In order to pull the application file 228 from the wireless enabled device 202, the application file 228 must be displayed on the display interface 330 of FIG. 3 of the wireless enabled device 202 prior to transfer.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer readable medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the device communication system 100 or installed as a removable portion of the device communication system 100.

The physical transformation from the application file 228 of FIG. 2 in the first mobile device 212 can automatically be transferred to the wireless enabled device 202 without intervention, the results in the movement in the physical world, such as displaying the application file 228 on the display screen 204 of the wireless enabled device 202. Movement in the physical world results in changes to the application file 228 performed on the wireless enabled device 202 can be restored to the first mobile device 212 without intervention by the user of the wireless enabled device 202.

Figure 5:
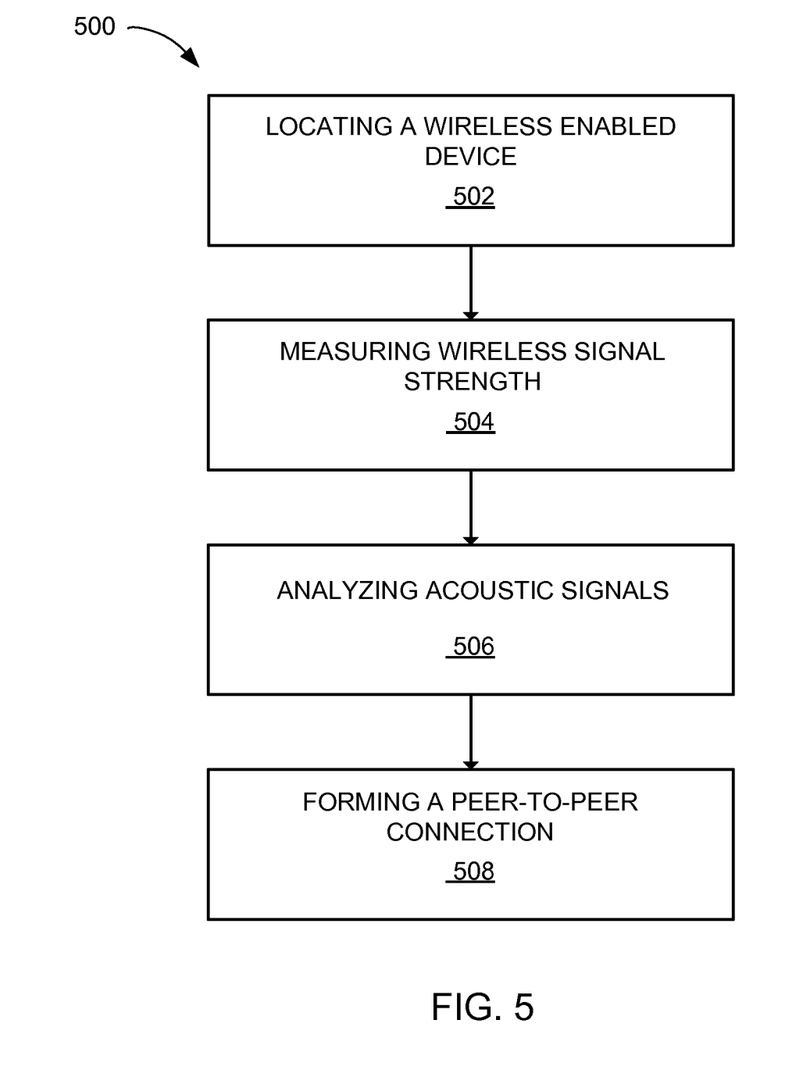
FIG. 5 is a flow chart of a method of operation of a device communication system in an embodiment of the present invention.

Referring now to FIG. 5, therein is shown a flow chart of a method 500 of operation of a device communication system 100 in an embodiment of the present invention. The method 500 includes: contacting a server device for locating a wireless enabled device in a block 502; measuring a wireless signal strength in a block 504; analyzing a left acoustic signal and a right acoustic signal for determining an acoustic direction of the wireless enabled device in a block 506; and forming a peer-to-peer network connection based on the wireless signal strength and the acoustic direction in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A device communication system comprising:
    a communication interface configured to receive a wireless signal strength for locating a wireless enabled device;
    a control interface, coupled to the communication interface, configured to measure the wireless signal strength;
    a user interface, coupled to the control interface, configured to receive a left acoustic signal and a right acoustic signal for determining an acoustic direction; and
    a control unit, coupled to the user interface, configured to form a peer-to-peer network connection based on the wireless signal strength and the acoustic direction.

2. The system as claimed in claim 1 further comprising a storage unit, coupled to the control unit, configured to store an application file for transferring the application file to the wireless enabled device.

3. The system as claimed in claim 1 wherein the communication interface is configured to transfer an application file through the peer-to-peer network connection.

4. The system as claimed in claim 1 further comprising a communication unit, coupled to the peer-to-peer network connection, configured to transfer an application file to the wireless enabled device.

5. The system as claimed in claim 1 further comprising a location unit, configured to provide a device location, coupled to the control unit for transferring the device location.

6. The system as claimed in claim 1 further comprising a communication unit, coupled to the control unit, configured to transfer an application file automatically when the peer-to-peer network connection is established.

7. The system as claimed in claim 1 wherein the user interface includes a touch screen configured to control transfer of an application file across the peer-to-peer network connection.

8. A device communication system comprising:
    a communication interface configured to receive a wireless activation command from a server device based on a proximate resource request from a mobile device;
    a user interface, including a left speaker and a right speaker, coupled to the communication interface, configured to emit a left acoustic signal from the left speaker and a right acoustic signal from the right speaker; and
    a control unit, coupled to the user interface, configured to:
        provide an acoustic direction for the mobile device based on the left acoustic signal, the right acoustic signal, or a combination thereof,
        activate a communication unit to provide a wireless signal strength, and
        form a peer-to-peer network connection with the mobile device based on the acoustic direction and the wireless signal strength.

9. The system as claimed in claim 8 further comprising a wireless antenna, coupled to the communication unit, configured to establish a radius with the wireless signal strength, the left acoustic signal, and the right acoustic signal.

10. The system as claimed in claim 8 wherein the control unit configures communication unit to operate as a wireless access point by the wireless activation command.

11. The system as claimed in claim 8 wherein the communication unit is configured to operate as a wireless access point to establish the peer-to-peer network connection and transfer an application file.

12. A method of operation of a device communication system comprising:
    contacting a server device for locating a wireless enabled device;
    measuring a wireless signal strength;
    analyzing a left acoustic signal and a right acoustic signal for determining an acoustic direction of the wireless enabled device; and
    forming a peer-to-peer network connection based on the wireless signal strength and the acoustic direction.

13. The method as claimed in claim 12 further comprising transferring an application file to the wireless enabled device through the peer-to-peer network connection.

14. The method as claimed in claim 12 wherein forming the peer-to-peer network connection includes displaying an application file transferred through the peer-to-peer network connection on a display screen.

15. The method as claimed in claim 12 further comprising transferring an application file upon forming the peer-to-peer network connection.

16. The method as claimed in claim 12 wherein contacting a server device includes transmitting a proximate resource request for determining a first radius.

17. The method as claimed in claim 12 further comprising transferring an application file in response to motioning on a touch screen in the acoustic direction.

18. The method as claimed in claim 12 further comprising establishing a second radius smaller than a first radius for detecting the wireless signal strength from a wireless antenna.

19. The method as claimed in claim 12 further comprising sending a proximate resource request to the server device for establishing a first radius.

20. The method as claimed in claim 12 further comprising analyzing the wireless signal strength, the left acoustic signal, and the right acoustic signal for locating the wireless enabled device.

21. The method as claimed in claim 12 further comprising transferring an application file through the peer-to-peer network connection including displaying the application file on a display screen.

22. A method of operation of a device communication system comprising:
    transmitting a wireless signal strength, a left acoustic signal, and a right acoustic signal;
    forming a peer-to-peer network connection based on the wireless signal strength, the left acoustic signal, and the right acoustic signal; and
    receiving an application file for communicating the application file with a wireless enable divice.

23. The method as claimed in claim 22 further comprising receiving a wireless activation command from a server device for forming the peer-to-peer network connection.

24. The method as claimed in claim 22 further comprising receiving a wireless activation command from a server device for transmitting the wireless signal strength, the left acoustic signal, and the right acoustic signal.

* * * * *